United States Patent
Lincoln et al.

(10) Patent No.: US 10,476,621 B2
(45) Date of Patent: Nov. 12, 2019

(54) METHODS AND ARRANGEMENTS FOR MITIGATING INTER-CLUSTER INTERFERENCE

(71) Applicant: Telefonaktiebolaget LM Ericsson (publ), Stockholm (SE)

(72) Inventors: Bo Lincoln, Lund (SE); George Jongren, Sundbyberg (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/561,969

(22) PCT Filed: Mar. 27, 2015

(86) PCT No.: PCT/EP2015/056691
§ 371 (c)(1),
(2) Date: Sep. 26, 2017

(87) PCT Pub. No.: WO2016/155758
PCT Pub. Date: Oct. 6, 2016

(65) Prior Publication Data
US 2018/0115381 A1    Apr. 26, 2018

(51) Int. Cl.
*H04J 11/00*    (2006.01)
*H04B 7/024*    (2017.01)
(Continued)

(52) U.S. Cl.
CPC .......... *H04J 11/0053* (2013.01); *H04B 7/024* (2013.01); *H04B 7/0439* (2013.01);
(Continued)

(58) Field of Classification Search
CPC .... H04B 7/024; H04B 7/0439; H04B 7/0452; H04B 7/0456; H04B 7/0617;
(Continued)

(56) References Cited

U.S. PATENT DOCUMENTS

2008/0025200 A1* 1/2008 Tiirola .................... H04L 5/023
370/210
2012/0202558 A1* 8/2012 Hedberg ............... H04L 5/0058
455/550.1
(Continued)

OTHER PUBLICATIONS

PCT International Search Report, dated Dec. 21, 2015, in connection with International Application No. PCT/EP2015/056691, all pages.
(Continued)

*Primary Examiner* — Kan Yuen
(74) *Attorney, Agent, or Firm* — Leffler Intellectual Property Law, PLLC

(57) ABSTRACT

The present disclosure relates to methods and devices for mitigating inter-cluster interference in clusters where one or more network nodes are transmitting in coordination using several transceiver antennas. In particular the disclosure relates to improved precoder algorithms to be used for coordinated multipoint transmission applications. The disclosure also relates to corresponding computer programs. The disclosure proposes a method, performed in a coordination unit in a communication system, of mitigating inter-cluster interference, wherein the coordination unit is configured to coordinate transmissions in a cluster comprising one or more wireless devices and one or more network nodes, wherein the one or more network nodes are transmitting in coordination to the wireless devices in the cluster using several transceiver antennas. The method comprises receiving, for each transceiver antenna in each of the one or more network nodes, a signal comprising pre-defined sounding sequences transmitted by the one or more wireless devices of the cluster and sounding channel interference from one or more wireless devices outside the cluster. The method further comprises estimating, from the received signal, the sounding channel interference from the wireless (Continued)

devices outside the cluster. The method also comprises determining downlink precoder weights, for use when transmitting from the transceiver antennas of the cluster, using the estimated sounding channel interference from the one or more wireless devices outside the cluster.

20 Claims, 8 Drawing Sheets

(51) Int. Cl.

| | | |
|---|---|---|
| *H04B 7/0426* | (2017.01) | |
| *H04B 7/0452* | (2017.01) | |
| *H04B 7/0456* | (2017.01) | |
| *H04B 7/06* | (2006.01) | |
| *H04L 25/02* | (2006.01) | |
| *H04W 24/02* | (2009.01) | |
| *H04W 52/08* | (2009.01) | |
| *H04W 52/14* | (2009.01) | |
| *H04W 52/24* | (2009.01) | |
| *H04L 5/00* | (2006.01) | |
| *H04L 25/03* | (2006.01) | |

(52) U.S. Cl.
CPC ......... *H04B 7/0452* (2013.01); *H04B 7/0456* (2013.01); *H04B 7/0617* (2013.01); *H04L 5/0035* (2013.01); *H04L 5/0051* (2013.01); *H04L 25/021* (2013.01); *H04L 25/0228* (2013.01); *H04L 25/03343* (2013.01); *H04L 25/03898* (2013.01); *H04W 24/02* (2013.01); *H04W 52/08* (2013.01); *H04W 52/143* (2013.01); *H04W 52/243* (2013.01); *H04W 52/244* (2013.01); *H04L 25/0242* (2013.01)

(58) Field of Classification Search
CPC ................ H04J 11/0053; H04L 25/021; H04L 25/0228; H04L 25/0242; H04L 25/03343; H04L 25/03898; H04L 5/0035; H04W 24/02; H04W 52/08; H04W 52/143; H04W 52/243; H04W 52/244
See application file for complete search history.

(56) References Cited

U.S. PATENT DOCUMENTS

| | | | | |
|---|---|---|---|---|
| 2012/0275411 | A1* | 11/2012 | Kim | H04L 5/0032 370/329 |
| 2012/0307772 | A1* | 12/2012 | Kwon | H04L 5/0007 370/329 |
| 2013/0303199 | A1* | 11/2013 | Siomina | H04W 64/00 455/456.5 |
| 2017/0079051 | A1* | 3/2017 | Sihlbom | H04L 25/0224 |

OTHER PUBLICATIONS

PCT Written Opinion, dated Dec. 21, 2015, in connection with International Application No. PCT/EP2015/056691, all pages.
3GPP TSG-RAN WG1#74, R1-133213, Barcelona, Spain, Aug. 19-23, 2013, Beamforming with Coordinated Sounding (BF-CoS) exploiting TDD channel reciprocity, DAC-UPC, IAESI, pp. 1-10.
Shirish Nagaraj, et al., Coordinated Beamforming in Clustered HetNets: System Design and Performance Evaluation, IEEE WCNC 2014—Workshop on Interference and Design Issues for Future Heterogeneous Networks, pp. 70-75.
Axel Muller et al., Interference-Aware RZF Precoding for Multi Cell Downlink Systems, arXiv:1408.2232v2 [cs.IT] Apr. 10, 2015, pp. 1-15.

* cited by examiner

METHODS AND ARRANGEMENTS FOR MITIGATING INTER-CLUSTER INTERFERENCE

TECHNICAL FIELD

The present disclosure relates to methods and devices for mitigating inter-cluster interference in clusters where one or more network nodes are transmitting in coordination using several transceiver antennas. In particular the disclosure relates to improved precoder algorithms to be used for coordinated multipoint transmission applications. The disclosure also relates to corresponding computer programs.

BACKGROUND

The 3rd Generation Partnership Project, 3GPP, is responsible for the standardization of the Universal Mobile Telecommunication System, UMTS, and Long Term Evolution, LTE. LTE is also sometimes referred to as Evolved Universal Terrestrial Access Network, E-UTRAN. LTE is a technology for realizing high-speed packet-based communication that can reach high data rates both in the downlink and in the uplink, and is a next generation mobile communication system relative to UMTS. LTE brings significant improvements in capacity and performance over previous radio access technologies.

The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

The ever increasing end-user demands are a significant challenge to the operators. Separating users spatially by means of precoding and/or beamforming is one way to improve the performance of a wireless system. Such techniques include Multi-User Multiple-Input Multiple-Output, MU-MIMO, coordinated beamforming and multi-user coherent joint transmission, where the two latter belong to the family of Coordinated Multi Point, CoMP, methods.

These techniques all use coherent transmission from many transmitter antennas that are not necessarily in the same physical site to multiple receiver antennas also not necessarily in the same physical location or UE, to extend classical MIMO spatial multiplexing to the Multi-User case. The coherent transmission is typically not only aiming at maximizing the received signal power at the desired receiver, but also at reducing interference to all non-desired receivers. In some cases transmission, TX, antennas are located in an antenna grid where all antenna elements effectively help to create a narrow beam towards the desired receiver. This is essentially the same as classical beamforming, but typically done considering several users at the same time. Hence, beams are directed to several users. In other cases, the TX antennas are spread out over the physical network, similar to today's cellular network deployments, but with a coherent transmission instead of today's uncoordinated each-cell-for-itself transmission.

Hence, the Coordinated Multipoint in LTE is essentially a range of different techniques that enable the dynamic coordination of transmission and reception over a variety of different base stations. The aim is to improve overall quality for the user as well as improving the utilization of the network. In CoMP the eNB:s dynamically coordinate their transmissions to provide joint scheduling and transmissions, as well as proving joint processing of the received signals. In this way a UE at the edge of a cell is able to be served by two or more eNBs to improve signals reception/transmission and increase throughput particularly under cell edge conditions.

When using coordinated multipoint transmission, clusters are defined in order to be able to coordinate the transmissions of different transmission antennas. A CoMP cluster is a set of transmission antennas which are transmitting in a coherent and coordinated way to a set of wireless devices. There are multiple CoMP clusters in a network. Coordination between different CoMP clusters is often not practically possible. However, in any practical Multi-User Joint Transmission deployment, the size of each cluster will have to be limited in order to create a reasonable load on the network baseband, backhaul communication etc. This will typically lead to incoherent interference between clusters. Though, today's precoder algorithms typically do not take this inter-cluster interference into account.

Hence, there is a need for improved precoder algorithms to be used for coordinated multipoint transmission applications.

SUMMARY

An object of the present disclosure is to provide methods and devices which seek to mitigate, alleviate, or eliminate one or more of the above-identified deficiencies in the art and disadvantages singly or in any combination and to mitigate inter-cluster interference in a communication system.

One embodiment provides a method, performed in a coordination unit in a communication system, of mitigating inter-cluster interference, wherein the coordination unit is configured to coordinate transmissions in a cluster comprising one or more wireless devices and one or more network nodes, wherein the one or more network nodes are transmitting in coordination to the wireless devices in the cluster using several transceiver antennas. The method comprises receiving, for each transceiver antenna in each of the one or more network nodes, a signal comprising pre-defined sounding sequences transmitted by the one or more wireless devices of the cluster and sounding channel interference from one or more wireless devices outside the cluster. The method further comprises estimating, from the received signal, the total sounding channel interference from the wireless devices outside the cluster, and determining downlink precoder weights, for use when transmitting from the transceiver antennas of the cluster, using the estimated sounding channel interference from the one or more wireless devices outside the cluster.

By using the proposed technique, inter cluster interference may be mitigated. By estimating sounding channel interference from the wireless devices outside the cluster and using the estimated sounding channel interference to determine downlink precoder weights, sounding interference from other clusters, usually referred to as "pilot pollution" is actively used to estimate the channels to inter-cluster wireless devices. The estimated channels are then used to avoid creating interference in the joint transmission also between clusters, and not only within a cluster. The technique provides determining a precoder based on information which can be estimated in the channel estimation procedure using existing technology, thereby enabling low implementation costs.

According to some aspects, the determining implies that the precoder weights are determined such that the interference that the transmissions from the transceiver antennas will cause to the wireless devices outside the cluster is reduced. These aspects enable multi-user joint transmission to give large network capacity gains over traditional serving-cell transmission, also in practical scenarios with non-coordinated interference and practical channel estimation. It is expected to bring performance benefits also in the cases of Multi-User Multiple-Input Multiple-Output and coordinated beamforming.

According to an aspect, the estimating comprises calculating sounding channel interference covariance estimates of the estimated sounding channel interference, and wherein the determining comprises determining precoder weights based on the sounding channel interference covariance estimates. These estimates can be obtained through a standard channel estimation procedure in combination with a setup of sounding signals.

According to an aspect, the method comprises estimating, using received pre-defined sounding sequences, channel estimation error estimates or channel estimation error covariance estimates corresponding to respective downlink channel estimates based on the received signal and wherein the determining comprises determining precoder weights based on the estimated channel estimation error or error covariance estimates. This aspect of the disclosure accounts for channel estimation quality when calculating the precoder, specifically in, but not limited to, forming the nulls to non-desired UEs. Since channel estimation quality is known per TX antenna, it means that the precoding algorithm will know which TX antennas are usable when transmitting to a certain UE and which are not.

According to an aspect, determining implies that the precoder weights are selected such that, transmissions to wireless devices outside the cluster are reduced to a higher extent for a first signal corresponding to a first channel estimation error than for a second signal corresponding to a second channel estimation error, when the first channel estimation error corresponds to a higher channel quality than the second channel estimation error. Simply put, when channel estimation quality is low, the system will not try to completely cancel its own signals for non-desired UEs, since it is quite uncertain about the actual channel to this UE. This increases robustness of the precoding.

According to an aspect, the method comprises transmitting data using the determined precoder weights. Then it is possible to maximize the average system throughput and maximize the cell edge user throughput and minimize the total system transmission power.

According to an aspect, the method comprises scheduling the sounding sequences transmitted by the one or more wireless devices in the cluster. The sounding sequences may then be scheduled to enable efficient downlink shared channel sounding sequence data resource assignment.

According to an aspect, the scheduling comprises coordinating sounding sequence transmissions between the cluster and at least one other cluster. In a TDD system, UL and DL are more or less always synchronized since otherwise the interference between base stations would be devastating. The method requires that the UL and DL channels are reciprocal. If the cells are uncoordinated, the uplink and downlink transmissions do generally not take place in the same time instant, and therefore the coordination unit does not have the latest information on neither channel estimates nor interference covariance estimates. However, it is important that the wireless devices from neighboring clusters seen on the uplink sounding resources in the step of scheduling the sounding sequences are substantially the same as the wireless devices from neighboring clusters hit by interference from downlink transmission from the transceiver antennas of the cluster, and vice versa for surrounding clusters. If these two sets of wireless devices are substantially different, then the estimate of channel interference covariance becomes erroneous and the performance would thus suffer. One way to prevent the timing issues above is to introduce some form of coordination of pilot sounding transmission between clusters. According to an aspect, the scheduling comprises scheduling sounding sequences of at least one of the wireless devices within the cluster to at least partly overlap with the sounding sequences of at least one other cluster.

According to an aspect, the scheduling comprises scheduling the sounding signals a pre-defined time before a corresponding downlink transmission. This enables a good estimate of the sounding channel interference at the time of sounding signal transmission, since all wireless devices outside the cluster which the precoder tries to avoid interfering, because of a future colliding downlink transmission in a neighbor cluster, are being scheduled sounding signals at the same time as the devices in the own cluster.

According to an aspect, scheduling comprises scheduling orthogonal sounding sequences within each cluster. In this way, the network can estimate the downlink channel for all Transmission points to multiple wireless devices at the same time.

According to an aspect, the scheduling comprises scheduling sounding sequences in different clusters to have a correlation below a threshold. By scheduling the sounding sequences to be uncorrelated between, sounding interference from other clusters, usually referred to as "pilot pollution", can be used to estimate the channels to inter-cluster wireless devices.

According to an aspect, the cluster comprises only one network node comprising several transceiver antennas. An application for MU-MIMO is obtained by setting the cluster size to one, i.e. only one network node is included in the cluster. This would allow one node to partly also avoid transmitting towards possibly interfered wireless devices of neighboring nodes/points.

According to some aspects, the disclosure relates to a coordination unit configured to coordinate transmissions in a cluster comprising one or more wireless devices and one or more network nodes, wherein the one or more network nodes are transmitting in coordination to the wireless devices in the cluster using several transceiver antennas. The coordination unit comprises processing circuitry configured to implement aspects of the disclosed method of mitigating inter-cluster interference, with all the advantages described above in relation to the disclosed method of mitigating inter-cluster interference.

The present disclosure also relates to a network node configured to coordinate transmissions in a cluster comprising one or more wireless devices and one or more network nodes, wherein the one or more network nodes are transmitting in coordination to the wireless devices in the cluster using several transceiver antennas. The network node comprises a communication interface comprising one or more transceiver antennas, wherein the communication interface is configured for communication with a wireless device. The network node further comprises a coordination unit according as described above, with all the advantages described above in relation to the disclosed method of mitigating inter-cluster interference.

The present disclosure also relates to computer readable mediums, having stored there on a computer program which, when run in a coordination unit, causes the coordination unit to perform an aspect of the disclosed method of mitigating inter-cluster interference, with all the advantages described above in relation to the disclosed method of mitigating inter-cluster interference.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
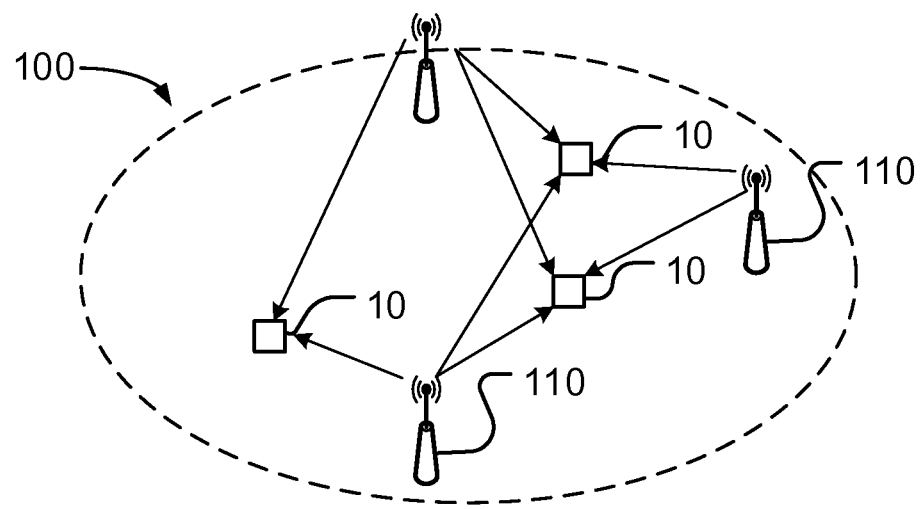
FIG. 1a illustrates multipoint transmission in a cluster in a communication system.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The essence of the proposed technique is a novel multi-user joint transmission scheme which takes inter-cluster interference into account. According to one variant the precoding scheme is further based on the channel estimation error. The channel estimation error is obtained through a standard channel estimation procedure in combination with a setup of sounding signals which are orthogonal within each CoMP cluster and (almost) uncorrelated between CoMP clusters. In essence, sounding interference from other CoMP clusters, usually referred to as "pilot pollution" is here desirable and actively used to estimate the channels to inter-cluster wireless devices, which are then used to avoid creating interference in the Joint Transmission also between CoMP clusters, and not only within a cluster.

Hence, the present disclosure proposes a precoding scheme which minimizes interference power caused to wireless devices outside the cluster. The proposed precoder will beam form away from active wireless devices in other clusters which would otherwise have suffered from interference by the transmissions from this cluster. The proposed precoding is based entirely on sounding signal measurements, i.e. information which can be estimated in the channel estimation procedure.

According to some aspects it also minimizes a mean squared error or deviation of the intended received signal within the cluster. This implies that the proposed technique, in some aspects, accounts for channel estimation quality when calculating the precoder, specifically in forming the nulls to non-desired wireless devices. Simply put, when channel estimation quality is low, the system will not try to completely cancel its own signals for non-desired UEs, since it is quite uncertain about the actual channel to this wireless device. This increases robustness of the precoding. Additionally, since channel estimation quality is known per TX antenna, it means that the precoding algorithm will know which TX antennas are usable when transmitting to a certain UE and which are not.

The proposed technique will now be described in further detail. However, as a starting point downlink channel estimation in multi-user joint transmission will first be briefly introduced.

FIG. 1a illustrates one example network where the proposed precoder may be implemented. In FIG. 1a three base stations 110, in LTE eNodeBs, are jointly transmitting to three wireless devices 10, in LTE UEs. In LTE this mode is referred to as coherent Joint TX, which is one of the defined COMP modes in LTE. In this mode, more than one point transmits the same data blocks to a UE simultaneously. The UE receives a combined version of signals from the more than one signal paths from different access points. The jointly transmitted signal can raise an average signal to noise plus interference ratio. As a consequence, the DL transmission quality is improved. Note that although LTE is generally used herein as an example, the same principle may be used in other cellular systems where cell synchronization is performed in a group of cells, in particular in a 5G network.

Hence, the base stations 110 are e.g. transmitting the same signal to one wireless device, from different antennas in different base stations 110a. A number of coordinated base stations 110 and wireless devices 10 are referred to as a cluster 100.

One of the key obstacles in multi-user joint transmission is that the transmitting side (e.g. the base station or similar network side function) need to know the per-physical-resource radio channel from transmission, TX, point to receiver, RX, antenna for each Transmission point and RX antenna in the network (typically called the downlink channel). In classical systems, only the receiver of data needs to estimate the channel to be able to demodulate the data, but here, in order to avoid interference and aim right, the transmitter needs this information as well.

In order to overcome this obstacle, it is assumed that the system uses the same radio channel frequency for both uplink and downlink transmissions (TDD) and that the classical channel reciprocity is usable. The latter means that the channel estimates for one direction can be used directly or indirectly to estimate the channel in the other direction. This is a quite reasonable assumption.

Figure 1B:
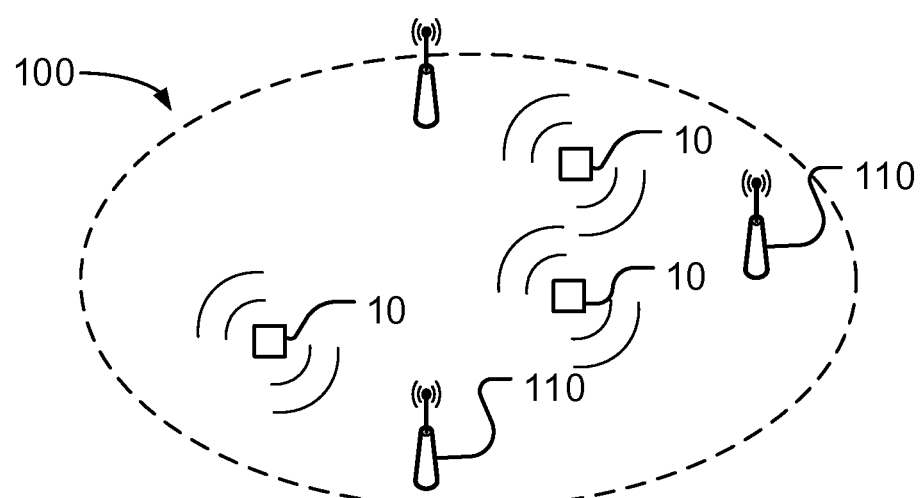
FIG. 1b illustrates sounding signal transmission.

The downlink channel estimates are obtained by letting the UEs periodically or aperiodically transmit pilot (or sounding) sequences to the transmission points which receive these sequences in order to estimate the channel. Typically, multiple orthogonal pilot sequences can be transmitted at the same time by several UEs within one cluster. In this way, the network can estimate the downlink channel for all Transmission points to multiple UEs at the same time (again, assuming reciprocity). This is illustrated in FIG. 1b.

Once the DL channel from each Transmission point to each UE RX antenna is known (or estimated), the network needs to calculate a precoding for each physical resource (or group of physical resources) in order to transmit the D data streams from N TX antennas to the M RX antennas. The vector of data symbols to be simultaneously transmitted in a physical resource can be denoted:

$$x = \begin{bmatrix} x_0 \\ x_1 \\ \vdots \\ x_{D-1} \end{bmatrix}$$

The downlink channel matrix is denoted H. The transmitted signal vector from the N TX antennas is denoted y and the received signal vector collecting the received signals from all antennas of all users in the cluster of interest is denoted z. Applying a linear precoding matrix W, the received signal vector becomes:

$$z = Hy = HWx$$

Calculating the precoding matrix W requires knowledge of the downlink channel H, in practice in form of a channel estimate $\hat{H}$ so that $W = f(\hat{H})$ (which can be a function of additional parameters as well) where $f$ is a function chosen e.g. to maximize the average system throughput, to maximize the cell edge user throughput or to minimize the total system TX power. Examples of classical precoding functions are SLNR (maximizing Signal-to-Leakage-and-Noise ratio), Zero Forcing (minimizing interference).

Figure 1C:
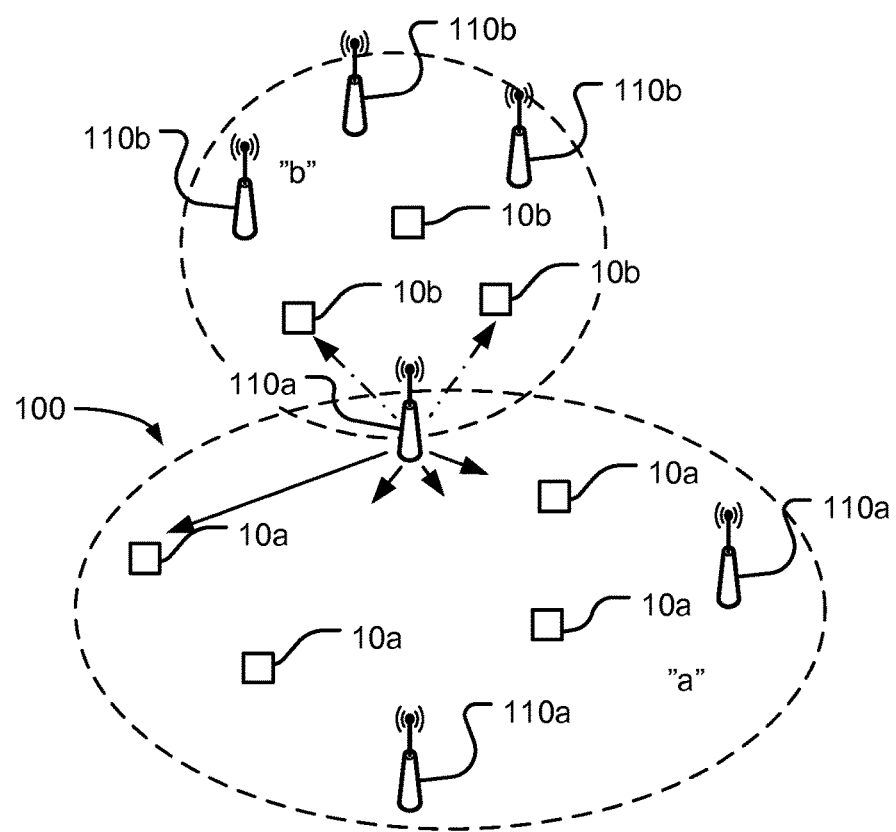
FIG. 1c illustrates interference between clusters in a communication system using multipoint transmission.

Turning to FIG. 1c a problem will now be identified and discussed. FIG. 1c illustrates two clusters a and b with coordinated devices. The devices in the cluster are enumerated using the letter of the cluster as a suffix. For examples the base stations of cluster "a" are enumerated 110a and the wireless devices of cluster "a" are enumerated 10a. As discussed before, when the base stations in cluster "a" are transmitting they try to cancel or at least minimize the interference caused to other wireless devices 10a within the cluster using precoding and/or beamforming. However, there may as well be wireless devices outside the cluster 10b that may be interfered by the transmission. This interference is referred to as inter-cluster interference. This disclosure proposes a new precoder weight calculating algorithm which takes an estimate of the caused inter-cluster interference into account and tries to minimize such interference.

In addition, many algorithms assume that the channel estimate $\hat{H}$ is perfect, i.e. that the estimated channel is equal to the actual channel $\hat{H} = H$. In other cases, the algorithm assumes a constant error covariance for all TX-RX antenna pairs. Neither of the assumptions is typically correct, which leads to a precoder which tries to perfectly cancel interference at the UE positions. However, since $\hat{H} \neq H$ this typically leads to bad performance.

Figure 2:
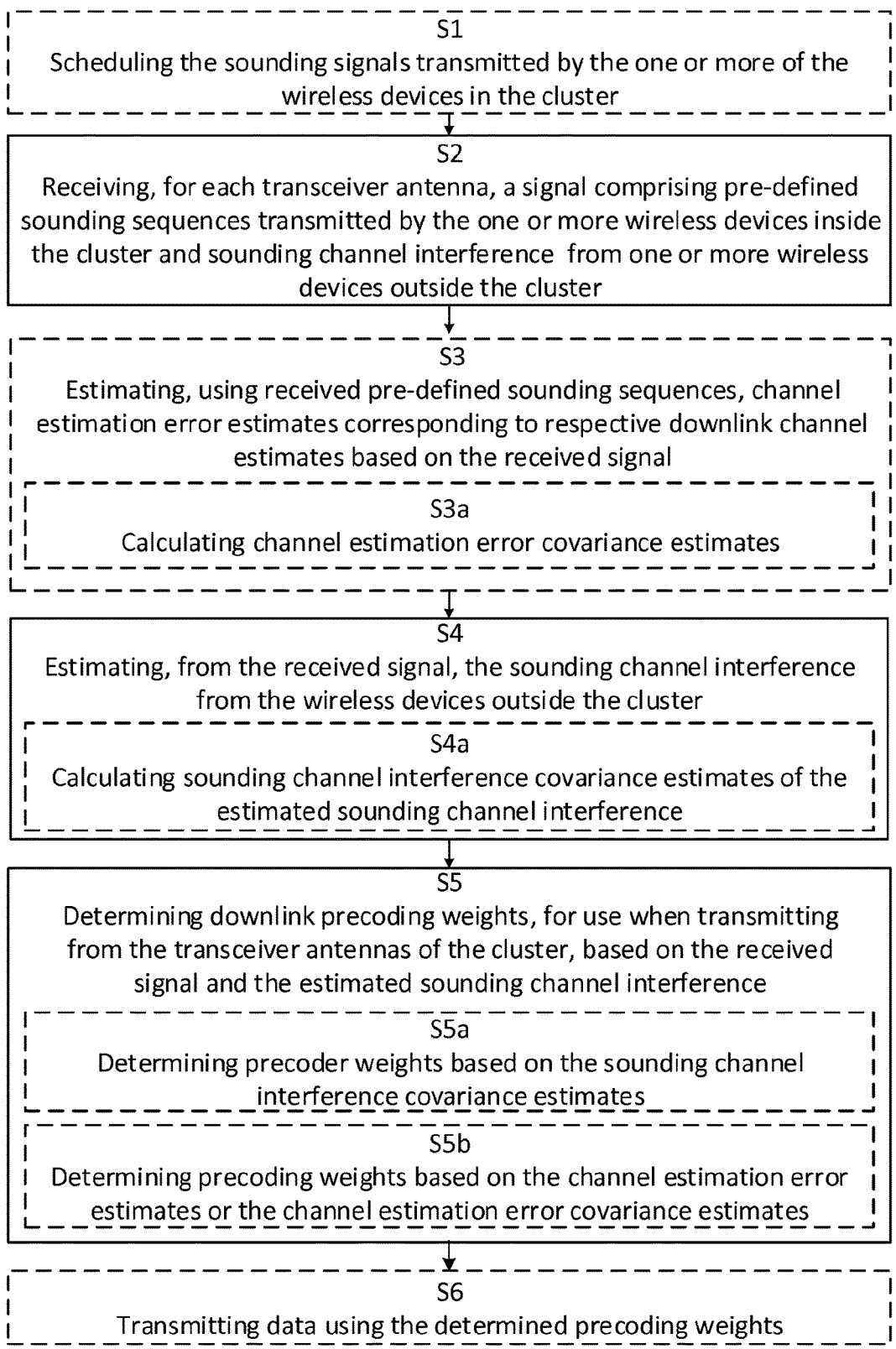
FIG. 2 is a flowchart illustrating embodiments of method steps.

A method, performed in a coordination unit configured to coordinate transmissions in a cluster 100, for mitigating inter-cluster interference, is now described referring to FIG. 2. The cluster, for example the cluster in FIG. 1a-c, comprises one or more wireless devices 10a and one or more network nodes 110a, wherein the one or more network nodes 110a are transmitting in coordination to the wireless devices 10a in the cluster using several transceiver antennas. The method is typically performed when network node 110a, such as an eNodeB, is about to transmit a signal to a wireless device in the cluster.

As discussed above, in order to calculate a suitable precoder, before transmitting, the network node needs to listen to the sounding signals transmitted by wireless devices in the cluster. According to some aspects, the method comprises scheduling S1 the sounding sequences transmitted by the one or more wireless devices 10a in the cluster 100. This implies that the network node 110a allocates resources e.g. time and frequency for the sounding signals and also informs the wireless devices about the resources. In most communication systems of today, the network node is responsible for all scheduling. However, other solutions are also possible, as discussed below.

The scheduling S1 typically comprises scheduling orthogonal sounding sequences within each cluster 100. In this way, the network can estimate the downlink channel for all transmission points to multiple wireless devices at the same time (again, assuming reciprocity). The downlink channel matrix is denoted H.

Then, in step S2, the coordination unit receives, for each transceiver antenna in each of the one or more network nodes 110a, a signal comprising pre-defined sounding sequences transmitted by the one or more wireless devices 10a of the cluster 100 and sounding channel interference from one or more wireless devices 10b outside the cluster 100. Each antenna corresponds to a transmission point. The antennas may be located in one or several network nodes. Because the sounding signals are known to the network nodes this enables calculation of the physical channel from the network nodes' transmit antennas to the wireless devices' receive antennas for a certain resource r at a certain time t. The time may be referred to as a transmission time interval, TTI.

Based on the knowledge of the channel and the sounding signals within the cluster it is also possible to estimate the part of the signal which is not sounding sequences transmitted by wireless devices in the cluster. Based on the knowledge the coordination unit estimates S4, from the received signal, the sounding channel interference from the wireless devices 10b outside the cluster. In other words, the network node estimates the channel, using the known sounding sequences. By analyzing the actually received signal it is, when knowing the channel, also possible to estimate the interference and noise. The sounding scheduled such that sounding sequences in different clusters have a correlation below a threshold. In other words, the sounding sequences are uncorrelated, or at least almost uncorrelated, between clusters. By channel analysis it may therefore be able to extract so called "pilot pollution". Hence, the network node may identify the sum of the "unknown" wireless devices that are also transmitting sounding signals.

The method further comprises determining S5 downlink precoder weights, for use when transmitting from the transceiver antennas of the cluster 100, using the estimated sounding channel interference from the one or more wireless devices 10b outside the cluster 100. This step implies utilizing the knowledge about possible "unknown" wireless devices in order to avoid disturbing them. Typically, implies that the precoder is estimated based on the estimated channel between the transmitters and receiver of the transmission in accordance with prior art, wherein the estimated sounding channel interference is also taken into account as an additional factor. According to some aspects, the determining S5 implies that the precoder weights are determined such that the interference that the transmissions from the transceiver antennas will cause to the wireless devices 10b outside the cluster 100 is minimized or reduced. Stated differently, the precoder is set to optimize the channel to the receiver or receivers, while still cancelling the interference both for wireless devices inside and outside the own cluster.

According to some aspects the method comprises the step of transmitting S6 data using the determined S5 precoder weights. This implies that the network node transmits data using the calculated precoder. Because the precoder was selected to consider even other cluster's wireless devices, the inter-cluster interference is reduced.

Different aspect and embodiments of the proposed technique will now be described in further detail.

Calculating Sounding Channel Interference Covariance

The sounding channel interference may be estimated in different ways. One example embodiment is to calculate S4a sounding channel interference covariance estimates of the estimated sounding channel interference. Then, the determining S5 comprises determining S5a precoder weights based on the sounding channel interference covariance estimates. This implies that the sounding channel interference covariance is estimated and that the precoder is calculated using the sounding channel interference covariance as one input value. The covariance represents the spatial statistics of the intercluster interference.

One example of calculating the channel interference covariance estimates will now be described in more detail.

The physical channel from the eNodeB TX antennas to the UE RX antennas for a certain resource r at a certain time t is denoted H (r,t) and since the channel is assumed reciprocal, the channel in the reverse direction is $H^T$ (r,t). In most of the equations below, the resource and time notation (r,t) is omitted for readability. The subscript U is used for the UE signals and matrices, and subscript E for the eNodeB signals.

Under noise-less conditions, given a vector of transmitted symbols $x_{eNB}$ at the eNB TX antennas, the channel H and the diagonal maximum TX gain is given by $P_E$ (which may be a complex rotation due to RX-TX phase differences), the noise-less received vector $\gamma_{UE}$ is given by $\gamma_U = HP_E x_E$ and symmetrically for the reverse direction with max UE TX gain matrix $P_U$ $\gamma_E = H^T P_U x_U$ It may be assumed that the UE TX gain matrix is diagonal with identical power gain on the diagonal, but the phase may be arbitrary:

$P_U P_U^H = |p_U|^2 I$

The precoder weights W are used by the transmitter eNB to calculate the transmitted signal vector as:

$x_E = Ws$ where s is a vector of unity power data symbols to be transmitted simultaneously from the set of eNBs to the set of UEs, i.e.

$\gamma_U = HP_E Ws$

The channel estimate of H is denoted Ĥ. The channel from the cluster TX antennas to inter-cluster UEs (i.e. UEs in other clusters) is denoted G. Note that one typical case is that the channel estimates of G are not available, since the precise sounding resources of another cluster are not known by the own cluster, possibly due to slow backhaul communication between clusters. The interference received by inter-cluster UEs from the transmission in this cluster is $z_U = GP_E Ws_E$.

It is then possible to define the inter-cluster interference channel covariance $\Lambda_G = E\{G^H G\}$.

Hence, this aspect proposes to include the interference channel covariance $\Lambda_G$ in the calculation of the precoder weights, i.e.

$W = f(\hat{H}, \Lambda_G)$.

Calculation of Channel Error

The examples so far have been assuming Ideal channel knowledge. However, this is not always the case. Simulations have shown that it the precoding algorithm assumes ideal channel knowledge, but if the channel knowledge is not ideal, due to e.g. a bad channel, the throughout will be affected.

Figure 6A:
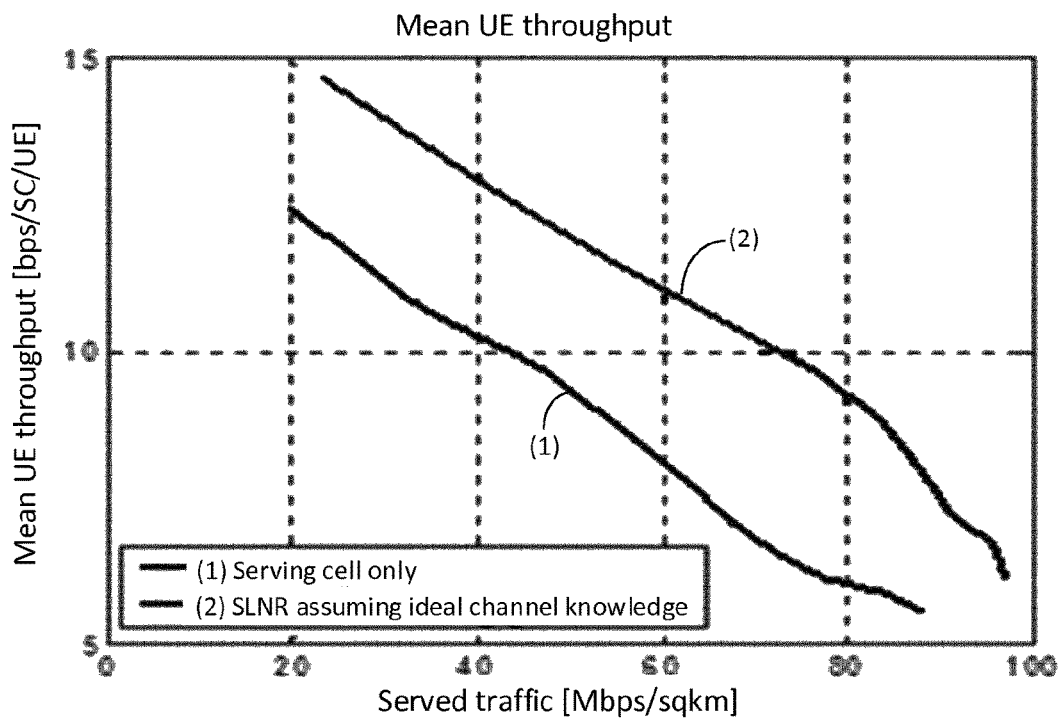
FIG. 6a illustrates throughput using a SLNR precoding algorithm with ideal channel knowledge.
Figure 6B:
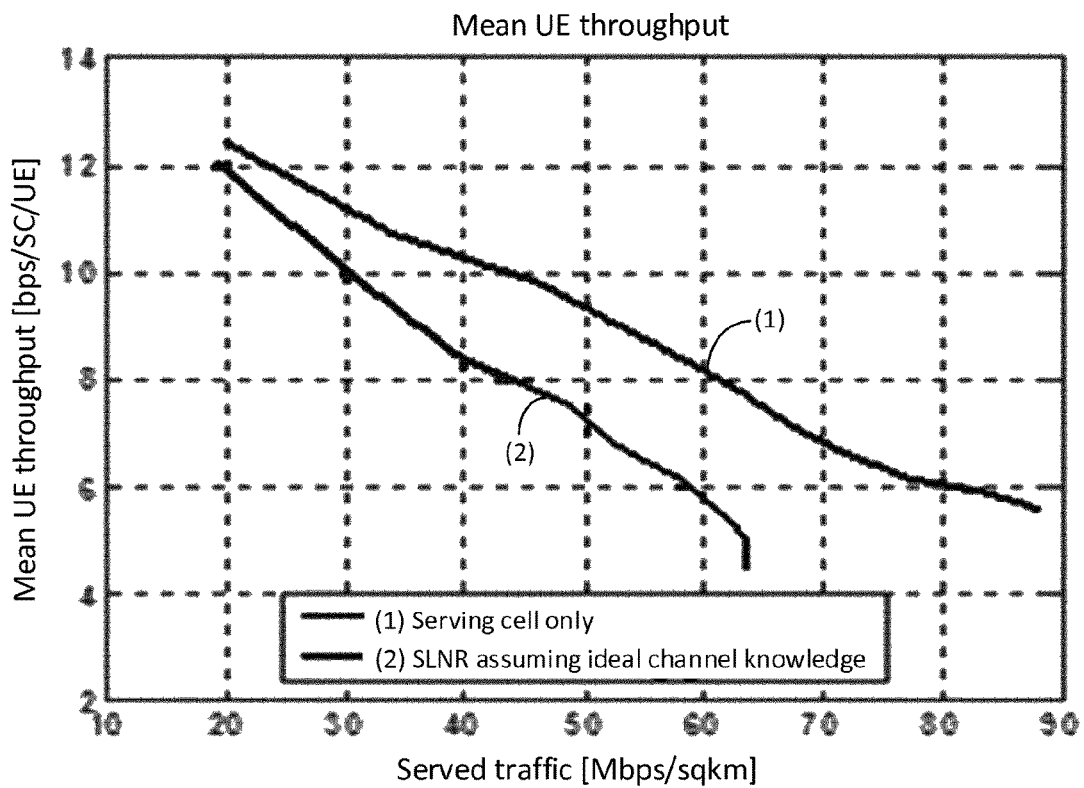
FIG. 6b illustrates throughput using a SLNR precoding algorithm with practical channel estimates.

FIG. 6a illustrates simulation of throughput using a SLNR precoding algorithm with ideal channel knowledge as input and FIG. 6b illustrates the same precoder with practical channel estimates as input. In both cases the SLNR precoding algorithm assumes that it has ideal channel knowledge. As can be seen, SLNR precoding gives nice gains for ideal channel knowledge, FIG. 6a, but all gains are turned into loss, FIG. 6b, compared to the legacy serving cell transmission when practical channel estimates are used.

Therefore, the proposed technique can be extended to further comprise estimating S3, using received pre-defined sounding sequences, channel estimation error estimates corresponding to respective downlink channel estimates based on the received signal and wherein the determining S5 comprises determining S5b precoder weights based on the estimated channel estimation error estimates. This aspect will now be further explained.

A typical example is that the determining S5 implies that the precoder weights are selected such that, transmissions to wireless devices 10b outside the cluster 100 are reduced to a higher extent for a first signal corresponding to a first channel estimation error than for a second signal corresponding to a second channel estimation error, when the first channel estimation error corresponds to a higher channel quality than the second channel estimation error.

In other words, ignoring this issue may create a precoding algorithm which does not work well in practical deployments. Therefore, according to some aspects, the method comprises calculating S3a channel estimation error covariance estimates, and the determining S5 comprises determining S5b precoder weights based on the channel estimation error covariance estimates. An example follows.

Define the channel estimation error $\tilde{H} = \hat{H} - H$ and the channel estimation error covariance $\Lambda_H = E\{\tilde{H}^H \tilde{H}\}$ Hence, this aspect of the proposed technique is to include both the channel estimation error covariance $\Lambda_H$ as well as the interference channel covariance $\Lambda_G$ in the calculation of the precoder weights, i.e.

$W = \Lambda(\hat{H}, \Lambda_H, \Lambda_G)$

In particular, the differences in results between FIGS. 6a and 6b illustrate that it is typically not a good idea for the precoder to try to perfectly cancel the interference at the positions of the wireless devices. Therefore, according to some aspects, determining S5 downlink precoder weights implies that the precoder weights are selected such that, transmissions to wireless devices outside the cluster are reduced to a higher extent for a first signal corresponding to a first channel estimation error than for a second signal corresponding to a second channel estimation error, when the first channel estimation error corresponds to a higher channel quality than the second channel estimation error.

Below, a few different potential embodiments of how the precoder may be determined in step S5, using a so called precoding calculation function, as well as the estimation of $\Lambda_H$ and $\Lambda_G$ are presented.

Estimation of Channel Error Covariance and Inter-Cluster Interference Channel Covariance One example of channel estimation and inter-cluster interference channel covariance estimation follow below. However, the disclosure is not limited to this example.

In the uplink, the set of eNodeBs receives a vector samples $\gamma_E$ per resource r $$\gamma_E = H^T P_U x_U + G^T P_I x_I + e$$

where e is white background noise with $E\{ee^H\} = \Sigma$, and $P_I$ is the UE TX gain matrix for the inter-cluster UEs.

It is assumed that the UE maximum TX scaling $P_U$ is known (through e.g. calibration), as well as the sounding sequences $x_U$ for the own cluster. It is also assumed that the outside cluster sounding sequences are $x_I$ uncorrelated with $x_U$. Also, the $x_U$ sequences are chosen so that UEs within the cluster are orthogonal over a set of resources, and each sequence symbol has unity gain so that $E\{x_U x_U^H\} = I$, $E\{x_I x_I^H\} = I$, and $E\{x_U x_I^H\} = 0$.

A standard channel estimation procedure is used to obtain a channel estimate $\hat{H}$ from the received samples $\gamma_E$ on sounding resources.

The instantaneous interference samples $\overline{\gamma_E}$, are calculated as:

$$\overline{\gamma_E} = \gamma_E - \hat{H}^T P_U x_U = (H^T - \hat{H}^T) P_U x_U + G^T P_I x_I + e$$

The expected covariance of $\overline{\gamma_E}$ is formed as $$\begin{aligned}\Lambda &= E\{(\overline{\gamma_E}(\overline{\gamma_E})^H)^T\} \\ &= E\{\tilde{H}^H P_U^* x_U^* x_U^T P_U^T \tilde{H}\} + E\{G^H P_I^* P_I^T G\} + \sum\nolimits^T \approx \\ &\approx E\{\tilde{H}^H P_U^* P_U^T \tilde{H}\} + E\{G^H P_I^* P_I^T G\} + \sum\nolimits^T \\ &= |p_U^2| E\{\tilde{H}^H \tilde{H}\} + |p_I^2| E\{G^H G\} + \sum\nolimits^T \\ &= |p_U^2| \Lambda_H + |p_I^2| \Lambda_G + \sum\nolimits^T\end{aligned}$$

where the approximately equal comes from some remaining the correlation between $\tilde{H}$ and $x_U$ from the channel estimation procedure, but this correlation becomes very small for larger channel estimation processing gains.

The estimate $\hat{\Lambda}$ is straightforward to calculate by e.g. averaging of $\overline{\gamma_E}(\overline{\gamma_E})^H$ samples over a coherent region of resources. With the assumption that the system is interference limited so that $\|\Sigma\| \ll \|\Lambda\|$ and UE TX gains intra- and inter-cluster are equal $|p_I^2| = |p_U^2|$ the following approximation holds:

$$\Lambda_H + \Lambda_G \approx \frac{1}{|p_U^2|} \Lambda \approx \frac{1}{|p_U^2|} \hat{\Lambda}$$

It should be noted that the 3GPP requirements for UE power control are not very strict, and thus the assumptions above on output power being equal may not hold. Techniques for mitigating this, if necessary, are outside the scope of this disclosure.

Precoder Weight Selection

Two different precoder weight calculation methods that may be used to determine S5 the precoder weights, will now be described. It should be noted that these methods produce identical weights given the same input, in spite of vastly different expressions.

According to some aspects, the determining S5 comprises minimizing a sum of the estimated interference for the one or more wireless devices 10b outside the cluster 100, and a difference between the resulting effective channel between the transceiver antennas and the wireless devices in the cluster and a corresponding desired effective channel.

The classical Zero Forcing precoder weight calculation means calculating W so that HW=R, where R is the desired effective channel from data stream to receiver antenna. Typically R is chosen to be diagonal. Given only channel estimates $\hat{H}$ with error covariance $\Lambda_H$ the problem can be posed as minimizing $\|HP_E W - R\|_F^2$ and yields the optimal solution $$W = (P_E \hat{H}^H \hat{H} P_E + P_E \Lambda_H P_E)^{-1} P_E \hat{H}^H R = P_E^{-1} (\hat{H}^H \hat{H} + \Lambda_H)^{-1} \hat{H}^H$$

If instead the MSE of the effective channel plus the caused interference power for intercluster UEs, is minimized, i.e.

$$\|HP_E W - R\|_F^2 + \|GP_E W\|_F^2$$

the optimal solution becomes $$W = P_E^{-1} (\hat{H}^H \hat{H} + \Lambda_H + \Lambda_G)^{-1} \hat{H}^H R$$

Using the estimates of $\Lambda_H + \Lambda_G$ obtained in the channel estimation procedure, the Interference Aware Zero Forcing precoder becomes $$W = P_E^{-1} \left(\hat{H}^H \hat{H} + \frac{1}{|p_U^2|} \hat{\Lambda}\right)^{-1} \hat{H}^H R$$

SLNR is another popular precoder weight calculation method, and it has actually been shown to give identical results to ZF under certain circumstances. According to some aspects, the determining S5 comprises maximizing a Signal to Leakage and Noise Ratio of a channel between the transceiver antennas and the wireless devices in the cluster, wherein the maximizing comprises a regularization term which is based on the sounding channel interference estimates.

The standard SLNR weight calculation is to solve for generalized eigenvalues for each data stream (i.e. calculate each column of W individually). Defining $H_{\overline{m,:}}$ as H with the mth row removed, and as the mth row of $H_{m,:}$ column d of W is calculated as $$w_{:,d} = \text{argmax}(\text{eig}(\hat{H}_{d,:}^H \hat{H}_{d,:}, \hat{H}_{\overline{d,:}}^H \hat{H}_{\overline{d,:}} + \Sigma))$$

where $\Sigma$ is a regularization term and the argmax(eig(x,y)) notation means the eigenvector corresponding to the largest generalized eigenvalue of x and y.

To exploit the channel estimation error covariance estimate in the calculation, the regularization term $\Sigma$ is simply replaced by $\Lambda_H + \Lambda_G$:

$$w_{:,d} = \text{argmax}(\text{eig}(\hat{H}_{d,:}^H \hat{H}_{d,:}, \hat{H}_{\overline{d,:}}^H \hat{H}_{\overline{d,:}} + \Lambda_H + \Lambda_G))$$

Using the estimated covariance matrices from channel estimation procedure, the resulting precoder becomes $$W_{:,d} = \text{argmax}\left(eig\left(\hat{H}_{d,:}{}^H \hat{H}_{d,:}, \hat{H}_{\overline{d,:}}{}^H \hat{H}_{\overline{d,:}} + \frac{1}{|p_U^2|}\hat{\Lambda}\right)\right)$$

Time and Synchronization Aspects

In the preceding sections, the time aspect of the estimates was omitted for clarity. Typically, the UL and DL transmissions do not take place in the same time instant, and therefore the coordination unit does not have the latest information on neither channel estimates nor interference covariance estimates. The channel estimation filtering or extrapolation to the given time from previous sounding instants is a standard procedure outside of the scope of this disclosure. However, the timing aspect of the interference covariance estimate part will now be discussed.

In terms of the above notation, the problem is that for optimal precoding it is desirable to know $\Lambda(t)$ but only estimates up to time $t-\delta$ are available (due to e.g. signaling delays or UL/DL switching). Since different users are typically scheduled at different time instants, the covariance of the interfered inter-cluster users $\Lambda_G(t)=G(t)G^H(t)$ can change drastically with time t. The aspect of time-varying channels over time due to fading is of course also present, but usually much less important than the variation of scheduled users.

From the equations and reasoning above it should be clear that it is important that the UEs from neighboring clusters seen on the UL pilot sounding resources in step S1 of FIG. 2 are substantially the same as those out of own cluster UEs hit by interference from the transmission in step S6, and vice versa for surrounding clusters. If these two sets of UEs are substantially different, then the estimate of $\Lambda_G$ becomes erroneous and the performance would thus suffer.

There are at least two ways of handling this. According to some aspects, the scheduling S1 comprises coordinating sounding sequence transmissions between the cluster 100 and at least one other cluster.

One way to prevent the timing issues above is to introduce some form of coordination of pilot sounding transmission between clusters. Hence according to some aspects, the scheduling S1 comprises scheduling the sounding signals a pre-defined time before a corresponding downlink transmission. In its simplest form, this could be to set a fixed sounding-to-DL-transmission time gap $\Delta_{DL-SRS}$ so that the UEs scheduled for sounding at time instant $t-\Delta_{DL-SRS}$ are exactly the same UEs being scheduled for DL transmission at time t in all clusters. Then using $\hat{\Lambda}(t-\Delta_{DL-SRS})$ as an estimate for $\Lambda(t)$ in the precoder calculation is a good approximation since all UEs in G which the precoder tries to avoid interfering are being scheduled own DL data at the same time.

More advanced ways to coordinate include if one cluster knows the pilot sounding resources of another cluster the former cluster could select among its own UEs that are likely to be significant victim UEs (based e.g. on pathgain/RSRP estimates to find out the most strongly interfered UEs) of the latter cluster's transmissions during the time period between two pilot sounding occasions for the latter cluster and let those selected UEs' pilot sounding collide with the pilot sounding of the latter cluster. This implies that according to some aspects, the scheduling S1 comprises scheduling sounding sequences of at least one of the wireless devices 10a within the cluster 100 to at least partly overlap with the sounding sequences of at least one other cluster.

This thus provides a mechanism for a cluster to control which of its UEs should be taken into account (seen as victims) in a neighboring cluster's determination of its precoding. The clusters' pilot sounding resources could be set up in a predetermined fashion and knowledge of that sounding pattern could be shared among multiple clusters. Alternatively, a cluster may signal another cluster the pilot sounding pattern or individual future occasions.

If there is no way to coordinate the transmissions in the different CoMP clusters, one fallback solution is to filter or average the $\Lambda(t)$ in order to form an estimate of the expected interfered UE covariance at time t, $E\{\Lambda_G(t)\}=E\{G(t)G^H(t)\}$. In other words, this implies averaging several transmission time intervals, TTI, such as LTE sub frames.

On simple such filtering is a linear filter of the available $\hat{\Lambda}(t)$ samples, i.e.

$$\Lambda_H(t) + \Lambda_G(t) \approx \sum_{s=t-N}^{t-\delta} a_s \hat{\Lambda}(s)$$

for some filter time horizon N and a delay from latest received sounding to DL transmission $\delta$.

This approach requires no coordination at all between clusters, but on the other hand will result a very cautious precoding which tries to avoid a lot potential of inter-cluster UEs which are actually not being scheduled DL transmission at time t.

MU-MIMO Implementation

Figure 5:
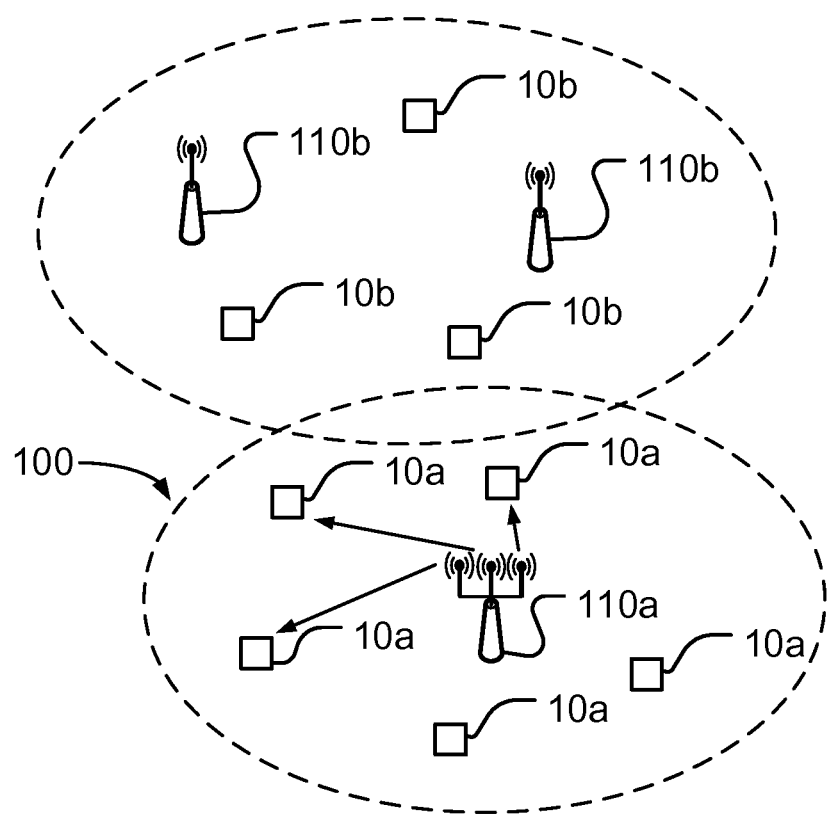
FIG. 5 illustrates a cluster comprising a single network node comprising several transceiver antennas in a MIMO-MU embodiment.

Although the focus of this disclosure has been exemplified by the application of coherent multi-user joint transmission CoMP, the technique can also be applied to MU-MIMO and coordinated beamforming. Hence, in one aspect of this disclosure the cluster comprises a single network node 110a comprising several transceiver antennas, as illustrated in FIG. 5.

An application for MU-MIMO is obtained by setting the number of network nodes to one in the previous derivation, i.e. only one network point/node is included in the cluster. This would allow one point/node to partly also avoid transmitting towards victim UEs of neighboring nodes/points. This could also be referred to as a version of coordinated beamforming. A variant of the MU-MIMO application could be to explicitly estimate also the channel G to victim UEs of neighboring points/nodes with a corresponding estimation error covariance $$\Lambda_G = E\{\tilde{G}^H \tilde{G}\}$$

The precoder would then be based on the expression $$W = P_E^{-1}(\hat{H}^H\hat{H} + \hat{G}^H\hat{G} + \Lambda_H + \Lambda_G)^{-1}\hat{H}^H R$$

This latter approach is also an example of coordinated beamforming. In fact, for both of the previously mentioned MU-MIMO techniques, a single UE, instead of multiple UEs, could be co-scheduled in the serving point/node and the focus would then be on the coordinated beamforming aspect, i.e., precoding to reduce interference to victim UEs of neighboring points/nodes.

Example Node Embodiments

Figure 3:
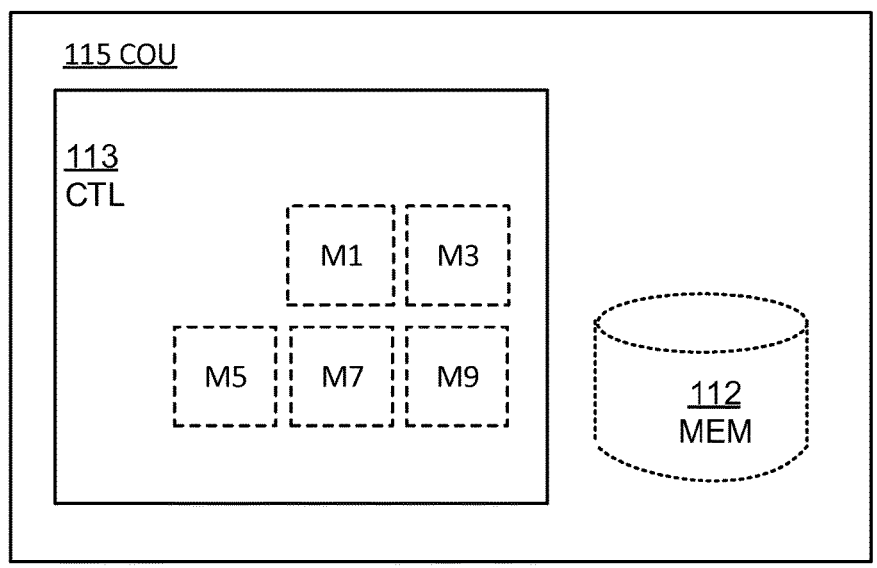
FIG. 3 is a block diagram illustrating embodiments of a coordination unit.

FIG. 3 illustrates an example coordination unit 115, according to some of the example embodiments, wherein the coordination unit 115 is configured to coordinate transmissions in a cluster comprising one or more wireless devices and one or more network nodes, wherein the one or more network nodes are transmitting in coordination to the one or more wireless devices in the cluster using several transceiver antennas. The coordination unit 115 comprises processing circuitry 113 configured to receive, for each transceiver antenna in each of the one or more network nodes 110a, a signal comprising pre-defined sounding sequences transmitted by the one or more wireless devices inside the cluster and sounding channel interference from one or more wireless devices outside the cluster. The processing circuitry 113 is further configured to estimate, from the received signal, the sounding channel interference from the wireless devices outside the cluster. The processing circuitry 113 is also configured to determine downlink precoding weights, for use when transmitting from the transceiver antennas of the cluster, based on the received signal and the estimated sounding channel interference. The processing circuitry 113 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry 113 need not be provided as a single unit but may be provided as any number of units or circuitry. The processing circuitry 113 may be in communication, directly or indirectly, with a radio communication interface (not shown). The processing circuitry 113 may be capable of executing computer program code. The coordination unit 115 may comprise a memory, MEM 112. The memory 112 may be comprised in the processing circuitry 113. A computer program may be stored in the memory 112. The computer program may, when run in the coordination unit 115, cause the coordination unit 115 to perform aspects of the method as disclosed above. The memory 112 can be any combination of a Random Access Memory, RAM, and a Read Only Memory, ROM. The memory 112 may comprise persistent storage, which, for example, can be any single one or combination of magnetic memory, optical memory, or solid state memory or even remotely mounted memory.

According to some aspects the processing circuitry 113 comprises modules configured to perform the methods described above. Hence, according to some aspects, the processing circuitry 113 comprises a receive module M1 configured to receive, for each transceiver antenna in each of the one or more network nodes 110a, a signal comprising pre-defined sounding sequences transmitted by the one or more wireless devices inside the cluster and sounding channel interference from one or more wireless devices outside the cluster. The processing circuitry 113 further comprises an estimation module M5 configured to estimate, from the received signal, the sounding channel interference from the wireless devices outside the cluster. The processing circuitry 113 also comprises a determination module M7 configured to determine downlink precoding weights, for use when transmitting from the transceiver antennas of the cluster, based on the received signal and the estimated sounding channel interference. The processing circuitry 113 may additionally comprise a transmit module M9 configured to transmit data using the determined precoding weights. The processing circuitry 113 may additionally comprise an estimation and calculation module M3 configured to estimate, using received pre-defined sounding sequences, channel estimation error estimates corresponding to respective downlink channel estimates based on the received signal, and calculate channel estimation error covariance estimates. According to some aspects, the coordination unit is implemented in a computer cloud. According to some aspects, the coordination unit is implemented in a software defined network, SDN.

Further details and advantages of the following aspects have been discussed above relating to aspects of the disclosed method.

According to some aspects, the processing circuitry 113 is configured to calculate sounding channel interference covariance estimates of the estimated sounding channel interference, and to determine precoding weights based on the sounding channel interference covariance estimates.

According to some aspects, the processing circuitry 113 is configured to estimate, using received pre-defined sounding sequences, channel estimation error estimates corresponding to respective downlink channel estimates based on the received signal and wherein the determining comprises determining precoding weights based on the estimated channel estimation error estimates.

According to some aspects, the processing circuitry 113 is configured to calculate channel estimation error covariance estimates, and wherein the determining comprises determining precoding weights based on the channel estimation error covariance estimates.

According to some aspects, determining implies that the precoding weights are selected such that, transmissions to wireless devices outside the cluster are reduced to a higher extent for a first signal corresponding to a first channel estimation error than for a second signal corresponding to a second channel estimation error, when the first channel estimation error corresponds to a higher channel quality than the second channel estimation error.

According to some aspects, the processing circuitry 113 is configured to schedule the sounding sequences transmitted by the one or more wireless devices in the cluster.

According to some aspects, the processing circuitry 113 is configured to transmit data using the determined precoding weights.

Figure 4:
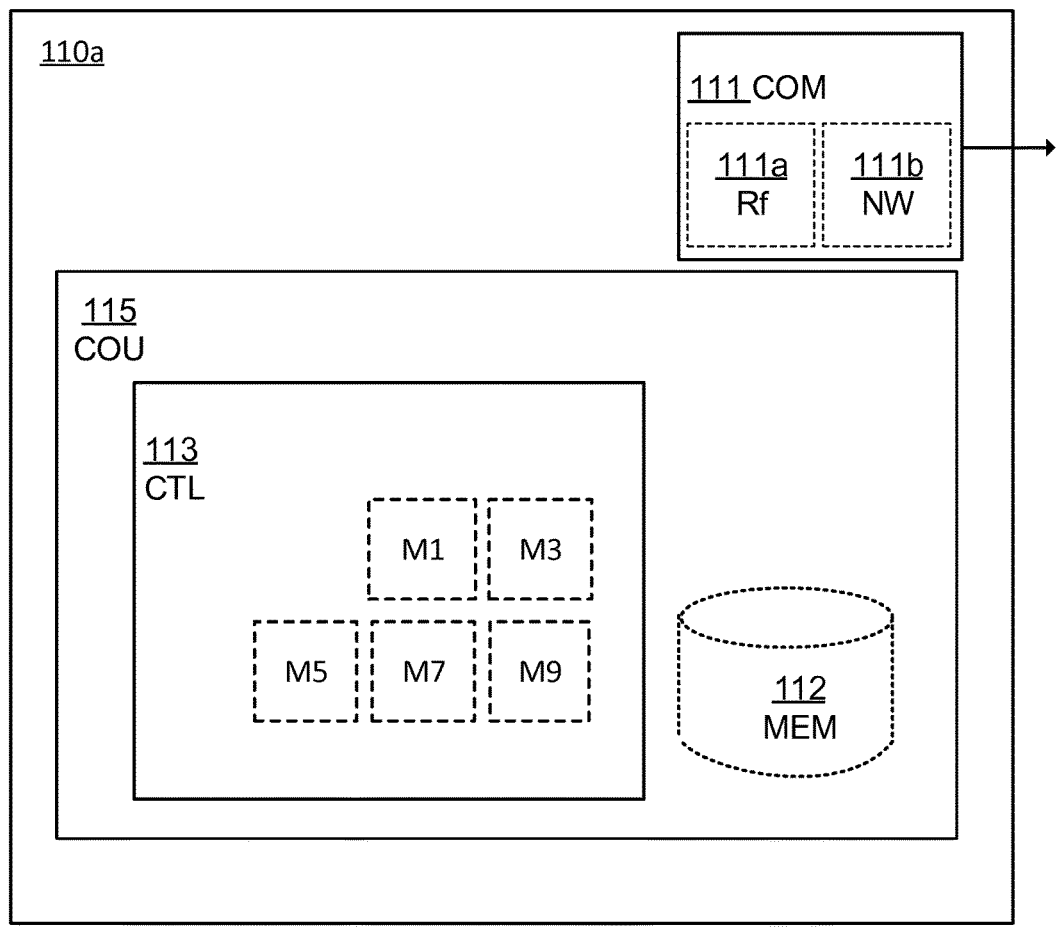
FIG. 4 is a block diagram illustrating embodiments of a network node.

FIG. 4 illustrates an example network node 110a, according to some of the example embodiments, wherein the network node 110a is configured to coordinate transmissions in a cluster comprising one or more wireless devices and one or more network nodes 110a, wherein the one or more network nodes 110a are transmitting in coordination to the wireless devices in the cluster using several transceiver antennas. The network node 110a comprises an embodiment of a coordination unit as described above in relation to FIG. 3. The network node 110a further comprises a communication interface 111 comprising one or more transceiver antennas, wherein the communications interface 111 is configured for communication with a wireless device. The communication interface 111 comprises a radio communication interface 111a and a network communication interface 111b.

The radio communication interface 111a is configured for communication with wireless devices within reach of the network node over a radio communication technology.

The network communication interface 111b is configured for communication with other network nodes. This communication is often wired e.g. using fiber. However, it may as well be wireless. The connection between network nodes is generally referred to as the backhaul.

Figure 7A:
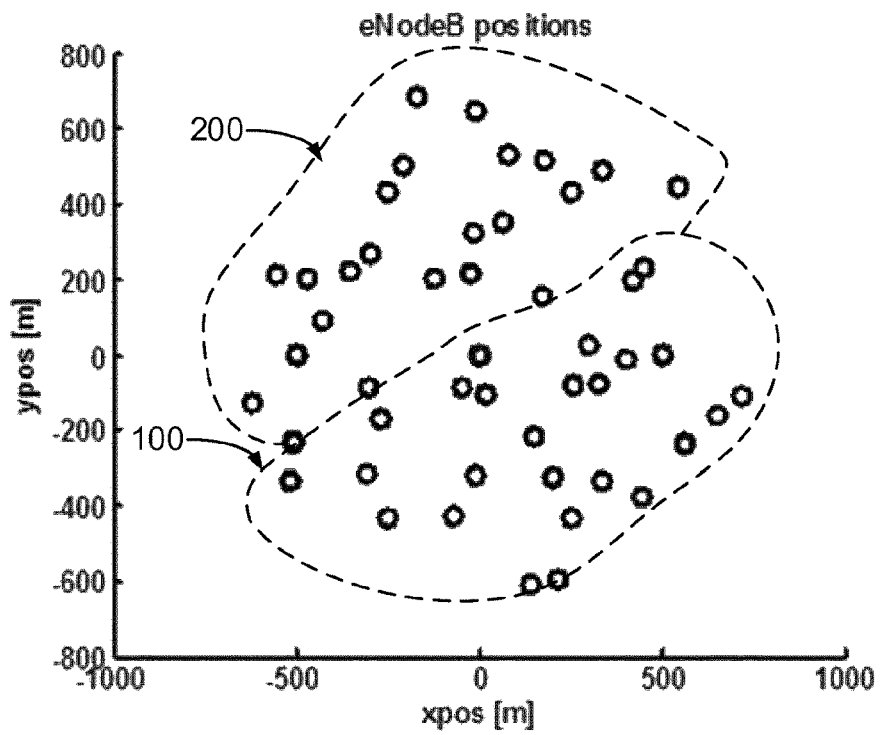
FIGS. 7a and 7b illustrate how throughput is improved in a simulation using the proposed methods.
Figure 7B:
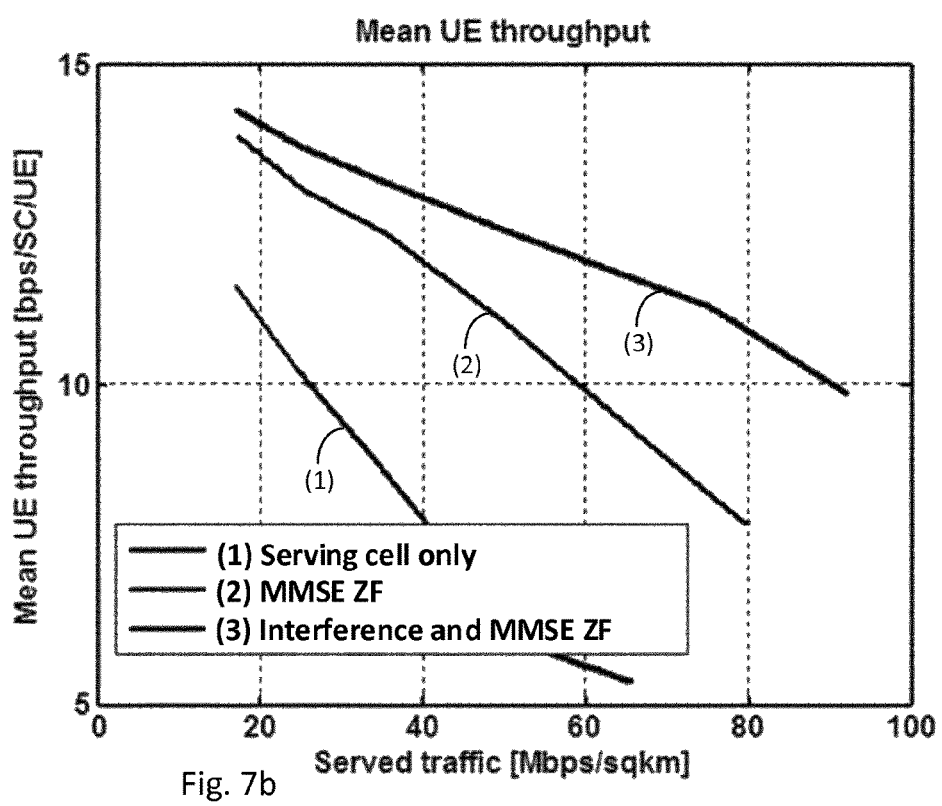

FIGS. 7a and 7b illustrate predicted gains obtained by Multi-User Joint Transmission over traditional serving cell transmission using the present invention.

FIG. 7a illustrates a simulation of a Multi-User Joint transmission using a custom Matlab simulator using standard 3GPP Hexagonal Hetnet models extracted from the Raptor simulator.

There are two network clusters 100, 200 where Multi-User Transmission is done individually within each cluster but where the two clusters are completely uncoordinated.

FIG. 7b illustrates mean wireless device throughput for different served traffic conditions. Multi-User Joint Transmission schemes based on Minimum Mean-Square-Error Zero Forcing, MMSE ZF, where inter-cluster interference is (the present invention), legend (3), and is not, legend (2), taken into account, are compared to legacy serving cell only scheduling (the typical LTE or HSPA networks today). The present invention is predicted to improve the mean wireless device throughput, with the improvement increasing as the served traffic, measured in data rate per area unit, increases.

Within the context of this disclosure, the terms "wireless terminal" or "wireless device" encompass any device which is able to communicate wirelessly with another device, as well as, optionally, with an access node of a wireless network, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

The invention claimed is:

1. A method, performed in a coordination unit in a communication system, of mitigating inter-cluster interference, wherein the coordination unit is configured to coordinate transmissions in a cluster comprising one or more wireless devices and one or more network nodes, wherein the one or more network nodes are transmitting in coordination to the wireless devices in the cluster using several transceiver antennas, the method comprising:
  receiving, for each transceiver antenna in each of the one or more network nodes a signal comprising a combination of pre-defined sounding sequences transmitted by the one or more wireless devices of the cluster and sounding channel interference from one or more wireless devices outside the cluster;
  estimating, from the received signal, the sounding channel interference from the wireless devices outside the cluster by calculating sounding channel interference covariance estimates of the received signal, using known sounding sequences; and
  determining downlink precoder weights, for use when transmitting from the transceiver antennas of the cluster, using the estimated sounding channel interference from the one or more wireless devices outside the cluster based on the sounding channel interference covariance estimates,
  wherein the method comprises scheduling the sounding sequences transmitted by the one or more wireless devices in the cluster,
  wherein the scheduling comprises coordinating sounding sequences of at least one of the wireless devices within the cluster to at least partly overlap with the sounding sequences of at least one other cluster, and
  wherein scheduling comprises scheduling orthogonal sounding sequences within each cluster.

2. The method according to claim 1, wherein the determining implies that the precoder weights are determined such that the interference that the transmissions from the transceiver antennas will cause to the wireless devices outside the cluster is reduced.

3. The method according to claim 1, wherein the method comprises:
  estimating, using received pre-defined sounding sequences, channel estimation error estimates corresponding to respective downlink channel estimates based on the received signal and wherein the determining comprises determining precoder weights based on the estimated channel estimation error estimates.

4. The method according to claim 3, wherein the method comprises calculating channel estimation error covariance estimates, and wherein the determining comprises determining precoder weights based on the channel estimation error covariance estimates.

5. The method according to claim 3, wherein determining implies that the precoder weights are selected such that transmissions to wireless devices outside the cluster are minimized to a higher extent for a first signal corresponding to a first channel estimation error than for a second signal corresponding to a second channel estimation error, when the first channel estimation error corresponds to a higher channel quality than the second channel estimation error.

6. The method according to claim 1, wherein the method comprises transmitting data using the determined precoder weights.

7. The method according to claim 1, wherein the scheduling comprises scheduling the sounding sequences a pre-defined time before a corresponding downlink transmission.

8. The method according to claim 1, wherein the scheduling comprises scheduling sounding sequences in different clusters to have a correlation below a threshold.

9. The method according to claim 1, wherein the determining comprises minimizing a sum of the estimated interference for the one or more wireless devices outside the cluster, and a difference between a resulting effective channel between the transceiver antennas and the wireless devices in the cluster and a corresponding desired effective channel.

10. The method according to claim 1, wherein the determining comprises maximizing a Signal to Leakage and Noise Ratio of a channel between the transceiver antennas and the wireless devices in the cluster, wherein the maximizing comprises a regularization term which is based on the sounding channel interference estimates.

11. The method according to claim 1, wherein the cluster comprises a single network node comprising several transceiver antennas.

12. A nontransitory computer readable medium, having stored thereon a computer program which, when run in a coordination unit in a communication system, causes the coordination unit to perform a method of mitigating inter-cluster interference, wherein the coordination unit is configured to coordinate transmissions in a cluster comprising one or more wireless devices and one or more network nodes, wherein the one or more network nodes are transmitting in coordination to the wireless devices in the cluster using several transceiver antennas, the method comprising:
  receiving, for each transceiver antenna in each of the one or more network nodes a signal comprising a combination of pre-defined sounding sequences transmitted by the one or more wireless devices of the cluster and sounding channel interference from one or more wireless devices outside the cluster;

estimating, from the received signal, the sounding channel interference from the wireless devices outside the cluster by calculating sounding channel interference covariance estimates of the received signal, using known sounding sequences; and determining downlink precoder weights, for use when transmitting from the transceiver antennas of the cluster, using the estimated sounding channel interference from the one or more wireless devices outside the cluster based on the sounding channel interference covariance estimates, wherein the method comprises scheduling the sounding sequences transmitted by the one or more wireless devices in the cluster, wherein the scheduling comprises coordinating sounding sequences of at least one of the wireless devices within the cluster to at least partly overlap with the sounding sequences of at least one other cluster, and wherein scheduling comprises scheduling orthogonal sounding sequences within each cluster.

13. A coordination unit configured to coordinate transmissions in a cluster comprising one or more wireless devices and one or more network nodes, wherein the one or more network nodes are transmitting in coordination to the wireless devices in the cluster using several transceiver antennas, the coordination unit comprising:

processing circuitry configured to:

receive, for each transceiver antenna in each of the one or more network nodes, a signal comprising a combination of pre-defined sounding sequences transmitted by the one or more wireless devices inside the cluster and sounding channel interference from one or more wireless devices outside the cluster;

estimate, from the received signal, the sounding channel interference from the wireless devices outside the cluster by calculating sounding channel interference covariance estimates of the received signal, using known sounding sequences; and determine downlink precoder weights, for use when transmitting from the transceiver antennas of the cluster, using the estimated sounding channel interference from the one or more wireless devices outside the cluster based on the sounding channel interference covariance estimates, wherein the processing circuitry is configured to schedule the sounding sequences transmitted by the one or more wireless devices in the cluster, wherein the scheduling by the processing circuitry comprises coordinating sounding sequences of at least one of the wireless devices within the cluster to at least partly overlap with the sounding sequences of at least one other cluster, and wherein scheduling by the processing circuitry comprises scheduling orthogonal sounding sequences within each cluster.

14. The coordination unit according to claim 13, wherein the processing circuitry is configured to determine the precoder weights such that the interference that the transmissions from the transceiver antennas will cause to the wireless devices outside the cluster is reduced.

15. The coordination unit according to claim 13, wherein the processing circuitry is configured to calculate sounding channel interference covariance estimates of the estimated sounding channel interference, and to determine precoder weights based on the sounding channel interference covariance estimates.

16. The coordination unit according to claim 13, wherein the processing circuitry is configured to:

estimate, using received pre-defined sounding sequences, channel estimation error estimates corresponding to respective downlink channel estimates based on the received signal and wherein the determining comprises determining precoder weights based on the estimated channel estimation error estimates.

17. The coordination unit according to claim 16, wherein the processing circuitry is configured to calculate channel estimation error covariance estimates, and wherein the determining comprises determining precoder weights based on the channel estimation error covariance estimates.

18. The coordination unit according to claim 16, wherein determining implies that the precoder weights are selected such that, transmissions to wireless devices outside the cluster are reduced to a higher extent for a first signal corresponding to a first channel estimation error than for a second signal corresponding to a second channel estimation error, when the first channel estimation error corresponds to a higher channel quality than the second channel estimation error.

19. The coordination unit according to claim 13, wherein the processing circuitry is configured to transmit data using the determined precoder weights.

20. A network node configured to coordinate transmissions in a cluster comprising one or more wireless devices and one or more network nodes, wherein the one or more network nodes are transmitting in coordination to the wireless devices in the cluster using several transceiver antennas, the network node comprising:

a communication interface comprising one or more transceiver antennas, the communication interface being configured for communication with a wireless device; and a coordination unit according to claim 13.

* * * * *